Sept. 20, 1938.  A. CRAIGON  2,130,582
AEROFOIL
Filed May 17, 1937  2 Sheets-Sheet 1
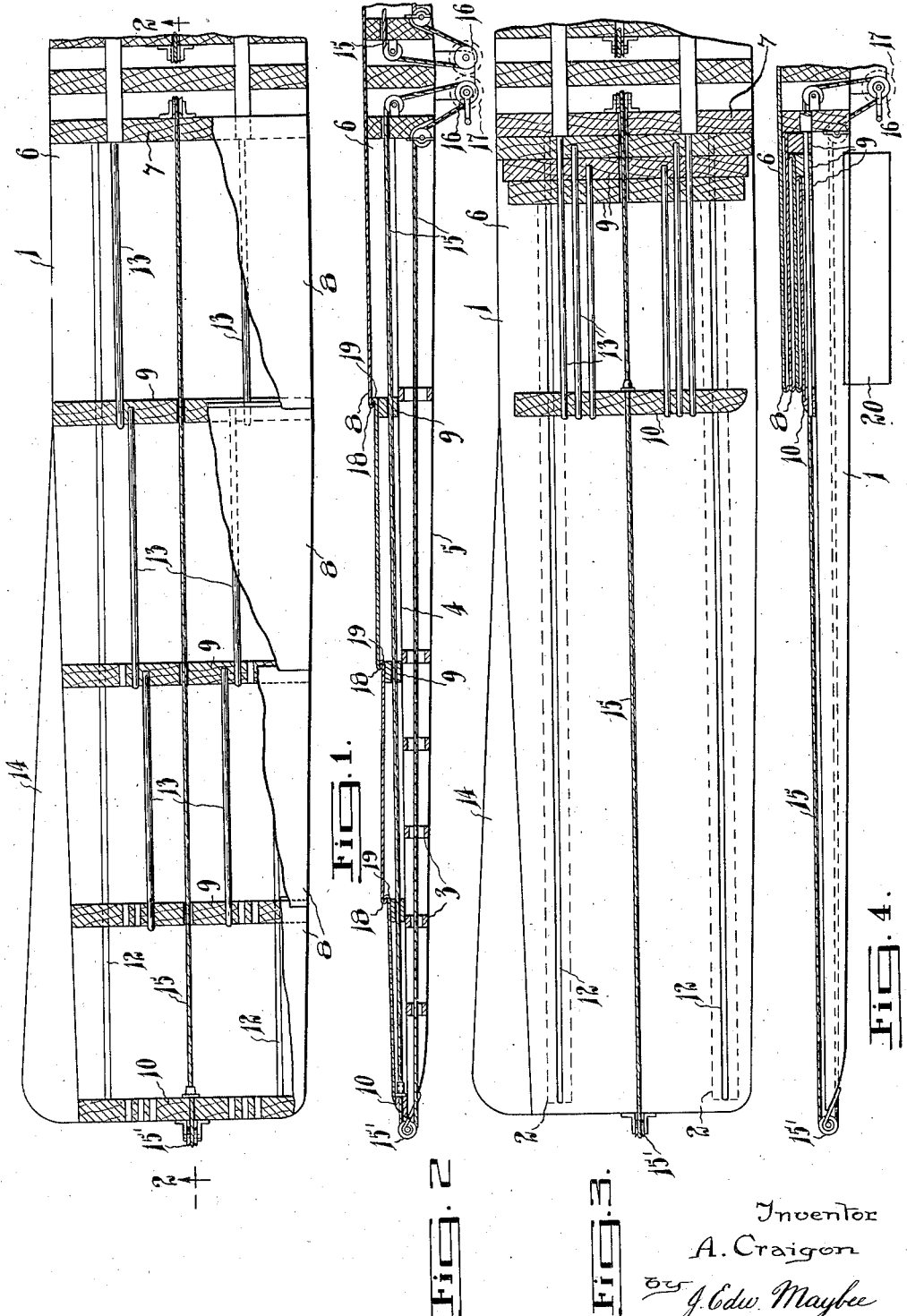

Sept. 20, 1938.  A. CRAIGON  2,130,582
AEROFOIL
Filed May 17, 1937  2 Sheets-Sheet 2
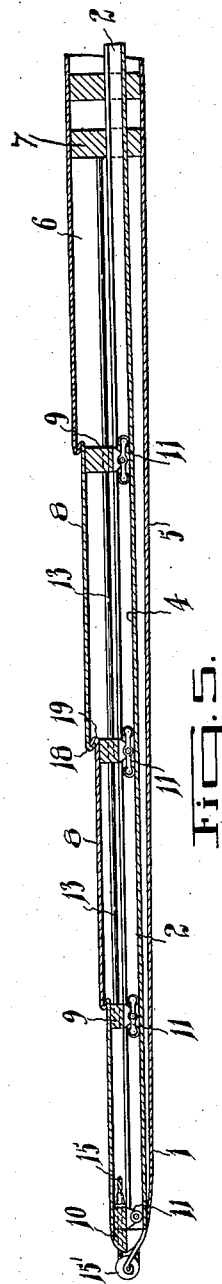
Inventor
A. Craigon
by J. Edw. Maybee
ATTY.

Patented Sept. 20, 1938

2,130,582

UNITED STATES PATENT OFFICE 2,130,582

AEROFOIL

Adam Craigon, Toronto, Ontario, Canada

Application May 17, 1937, Serial No. 143,072

3 Claims. (Cl. 244—44)

My object in the present invention is to devise an aerofoil which is adjustable at the will of the pilot to best suit the conditions met in take-off, actual flight or landing.

A further object is to produce an aerofoil with a flattened stalling curve and one in which the wing surfaces are readily de-iced while the plane is in flight.

With these objects in view my invention consists in the constructions hereinafter set forth and which may be briefly described as follows.

A main, or foundation wing is employed each half of which is formed with a comparatively flat camber which is a best compromise for speed and lift in the air. Secured to the root end of each half wing is a deep camber housing adapted to receive one or more superimposed members which may be referred to as wing covers as they serve to cover more or less of the upper surface of the wing. These wing covers are slidably and telescopically mounted on the wing so that they may all be received in the housing or extended to cover more or less of the upper surface of the wing.

These wing covers have their upper surfaces formed with a greater camber than that of the main wing so that the lifting effect of the aerofoil may be varied by projecting the wing covers more or less to vary the proportion of high cambered surface relative to low cambered surface.

Preferably the main wing is of fixed area and the wing covers when extended cover substantially the whole of the upper surface of the main wing.

I prefer to employ with my aerofoil what is known as a "split flap" used to increase drag in landing, which combination I find gives unexpectedly favorable results in flattening the plotted stalling curve.

It will be understood, of course, that other arrangements of the wing covers are possible which would fall within the scope of my invention.

The invention is hereinafter more fully described and is illustrated in the accompanying drawings in which Fig. 1 is a plan view, partly in section and partly broken away, of one half of my improved aerofoil with the wing covers extended;

Fig. 2 a section on the line 2—2 in Fig. 1;

Fig. 3 a view similar to Fig. 1 with the wing covers retracted;

Fig. 4 a front elevation, partly in section, with the wing covers retracted;

Fig. 5 a longitudinal section on the line 5—5 in Fig. 1;

Fig. 6 a cross section on an enlarged scale; and

Fig. 7 a sectional detail showing the adjacent edges of two wing covers interlocked.

In the drawings like numerals of reference indicate corresponding parts in the different figures.

Referring to the drawings, 1 is the main or foundation wing of the aerofoil. This is in the main of ordinary construction being provided with the usual spanwise extending spars 2 and the transverse frame members 3 on which are stretched the upper main wing surface 4 and the lower main wing-surface 5. These surfaces may be either a fabric or metal as is common in the art. It will be noted, particularly on reference to Fig. 6, that the upper and lower surfaces of the main or foundation wing are formed to give the wing a comparatively flat camber which is a best compromise between speed and lift in the air.

Located adjacent the root end of each half of the main wing is a housing 6, which is connected at its inner end to the transverse frame member 7 fixed to the root end of the half wing. The housing may be otherwise secured in position as experience may suggest. The housing 6 is adapted to receive a plurality of telescopic surfaces or wing covers 8. Both the housing and wing covers have their upper surfaces formed with a greater camber than that of the main wing so that the lifting effect of the aerofoil may be varied by projecting the wing covers more or less to vary the proportion of high cambered surface relative to low cambered surface.

While various means may be employed to enable the wing covers to be more or less extended as desired, I show the following constructions for that purpose. It will be noted that at the inner end of each of the telescopic sections there is provided a transverse rib 9, while the outermost of the wing covers is also provided with a transverse rib 10 at its outer end. The main spars 2 are box-like in cross section and running longitudinally of the upper side of each spar is a slot 12. Each of the ribs 9 and 10 is provided with slippers 11 running in the hollow spars preferably by means of roller bearings as shown. Each wing cover is thus held down in place on the main wing while they may be easily telescoped one within the other and all within the housing as may be desired.

To further guide the wing covers and to hold them down in place I secure to the transverse frame member or rib 7 and the ribs 9 the guide rods 13 which extend outwardly from their respective ribs. Each rib of the wing cover section is provided with holes for the passage of all the guide rods which lie between it and the root end of the wing when the wing covers are extended, see particularly Figs. 2 and 3.

It is thought preferable to lock the outer edge of each wing cover to the wing cover next to it nearer the tip of the wing and to effect a similar lock between the outer edge of the housing and the adjacent wing cover section. For this purpose I form a bend or hook 18 at the outer edge of the housing and at the outer edge of each of the intermediate wing covers. I also form similar bent or hooked ends 19 on the inner edges of each of the wing cover sections. These parts 18 and 19 will interlock, as shown in Fig. 7, and thus assist in holding the wing covers firmly to the main wing when fully extended for use.

While any desired means may be employed for extending and retracting the wing covers or surface sections I show for this purpose cables 15. Each cable is connected by its end to the inner and outer side of the outer transverse rib of the outer wing cover section, see particularly Fig. 2. This cable is carried round the guide pulleys 15' suitably journalled on the frame of the main wing and passes round a windlass 16 by means of which it may be actuated in either direction to draw the wing covers outwardly or retract them as desired. I show two windlasses, one for each half of the wing, which are connected by gearing 17, but, of course, other arrangements might be employed and in practice the windlasses would probably be power driven. Also two cables may be employed at each side, running through the hollow main spars.

The usual ailerons are indicated at 14 and may be mounted and operated in any known manner.

I also employ a device, shown at 20, Fig. 6, which is known in the art as a "split flap" and which is used to create drag in landing. When this used in connection with my wing with a part or the whole of its upper surface adjusted to high camber the stalling point of the plane is materially delayed making it possible to effect landings more safely and at much lower speeds than would otherwise be possible.

An aerofoil constructed as described makes it possible to design a plane for high speed which may be quickly adapted, at the will of the pilot, to give increased lifting effect whenever desired.

De-icing is effected by the scraping of the hooked edges 18 over the surfaces of the wing covers as the latter are retracted within one another and the housing and such edges are preferably made sharp enough to produce the desired effect and the top of the main wing is scraped off by the front edge of the outer wing cover.

What I claim as my invention is:

1. An aerofoil of substantially fixed area comprising a basic wing having a predetermined fixed wing section form; a housing at the root end of each half of the wing; and wing covers superimposed thereon each having its upper surface formed with a greater camber than that of the upper surface of the basic wing but having substantially the same length of mean chord, said covers being movable spanwise of the wing on its upper surface from positions within the housings to positions in which they cover more or less of the upper surface of the wing leaving the under surface exposed, thus changing the camber of the upper surface of the aerofoil without changing either the area of the foil or the shape of its under surface.

2. An aerofoil according to claim 1 in which the housings have a camber greater than that of the basic wing and similar to that of the wing covers.

3. An aerofoil comprising a basic wing with fixed chord, span and camber; and a plurality of spanwise slidable telescoping wing surfaces or covers of greater camber than the basic wing but having substantially the same length of mean chord and superimposable only on the upper surface of the wing, whereby more or less of the upper surface only of the basic wing may have surfaces of greater camber superimposed thereon leaving the under surface unaffected and substantially without increasing the area of the aerofoil.

ADAM CRAIGON.